United States Patent [19]
D'Amico

[11] 3,852,444
[45] Dec. 3, 1974

[54] FUNGICIDAL AND BACTERICIDAL 2-(N-2-CYANOETHYLDITHIOCARBAMYLMETHY-LENE-5-HYDROXY-4H-PYRAN-4-ONE AND METAL CHELATES

[75] Inventor: John Joseph D'Amico, Akron, Ohio
[73] Assignee: Monsanto Company, St. Louis, Mo.
[22] Filed: Dec. 3, 1973
[21] Appl. No.: 421,312

Related U.S. Application Data
[62] Division of Ser. No. 228,368, Feb. 22, 1973, Pat. No. 3,799,945.

[52] U.S. Cl................................. 425/245, 424/283
[51] Int. Cl................................................ A01n 9/00
[58] Field of Search .......... 260/345.9; 424/283, 245

[56] References Cited
UNITED STATES PATENTS
3,284,287    11/1966    D'Amico.............................. 424/300

*Primary Examiner*—Albert J. Myers
*Assistant Examiner*—Douglas W. Robinson
*Attorney, Agent, or Firm*—John L. Young

[57] ABSTRACT

2-(N-2-Cyanoethyldithiocarbamylmethylene)-5-hydroxy-4H-pyran-4-one and metal chelates thereof are effective agents for controlling undesirable fungi and bacteria.

11 Claims, No Drawings

FUNGICIDAL AND BACTERICIDAL 2-(N-2-CYANO-ETHYLDITHIOCARBAMYLMETHYLENE)-5-HYDROXY-4H-PYRAN-4-ONE AND METAL CHELATES

This is a division, of application Ser. No. 228,368, filed Feb. 22, 1973 now U.S. Pat. No. 3,799,945.

This invention relates to cyanoethyldithiocarbamic acid derivatives of kojic acid which are toxic toward microorganisms and are particularly valuable for controlling Venturia inaequalis, the pathogen responsible for apple scab disease. Chloroalkenyl esters of cyanoethyldithiocarbamic acid have been described by D'Amico as useful agents for the control of fungi, U.S. Pat. No. 3,284,287. Applicant herein combines the cyanoethyldithiocarbamyl moiety with the kojic acid moiety to form new compounds which exhibit excellent fungicidal activity.

SUMMARY OF THE INVENTION 2-(N-2-Cyanoethyldithiocarbamylmethylene)-5-hydroxy-4H-pyran-4-one and its metal chelates are potent agents for the control of fungi and bacteria. The new toxicants are valuable for controlling organisms on living plants because they exhibit fungicidal and bactericidal properties at low concentrations but are devoid of phytotoxic properties even at higher concentrations.

The subject compound is prepared by reaction of the ammonium salt of 2-cyanoethyldithiocarbamic acid and 2-(chloromethyl)-5-hydroxy-4H-pyran-4-one. The chemical formula for the compound is

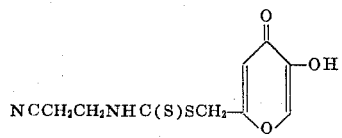

The metal chelates are prepared by complexing a metal salt with the 2-(N-2-cyanoethyldithiocarbamylmethylene)-5-hydroxy-4H-pyran-4-one. Examples of suitable metals from which chelates may be prepared are chromium, manganese, iron, cobalt, nickel, copper, zinc, cadmium, lead and mercury with the metals of atomic numbers of 26–30 being preferred. The chelates are recovered as hydrates with the following postulated structure

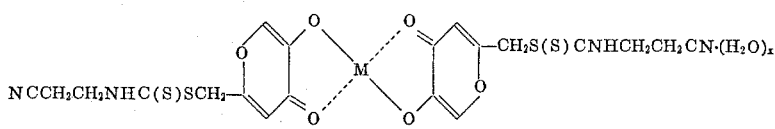

in which M is a metal ion and x is variable but generally is between 2–6 with x being about four when the chelates are dried at 45°C overnight.

The new toxicants are effective bactericides and fungicides and may be applied to the habitat of the pathogen to prevent its growth and spread. The bactericidal or fungicidal compositions containing the toxicant are applied to the area to be protected. If the area is already infected, the toxicant kills or inhibits further growth of the pathogen. If the treated area is pathogen-free, the toxicant keeps the area sterile by inhibiting growth of any pathogen which may invade the area. The term habitat is used in its ordinary dictionary sense meaning the place where the pathogen normally lives and grows. Typical habitats are warm, damp places, for example, locker-room floors or in the case of plant pathogens, the habitat is the foliage of the plant.

Fungicidal compositions are prepared by combining one of the above described toxicants with a liquid or solid carrier. The chelates are insoluble in water and organic solvents and the 2-(N-2-cyanoethyldithiocarbamyldithiomethylene)-5-hydroxy-4H-pyran-4-one is insoluble in water but is soluble in certain organic solvents, for example, acetone and dimethyl formamide. Aqeuous dispersions of the toxicants may be prepared to form concentrates which may be diluted with water to form a spray suitable for application to the area to be protected. It is recommended that a dispersing agent be used to facilitate the formation of a more stable emulsion. The toxicants may also be blended with an inert solid diluent such as talc, diatomaceous earth, fuller's earth, etc., to form dry compositions which are dispersed in an aqueous medium to form a liquid spray. In general, any of the conventional formulation and application techniques are applicable with the subject toxicants and includes combinations with the many known wetting agents and inert carriers and includes combinations with other functional biological agents such as herbicides and insecticides.

The concentration of toxicant used varies depending upon the particular pathogen which the treatment is intended to control. Amounts of one percent to one part per million are effective with dosages of about 100 ppm being generally used. Of course, it is understood that greater or lesser amounts may be used and that the invention applies to any concentration at which toxic effects or inhibition of the bacteria or fungi is obtained.

DESCRIPTION OF THE PREFERRED EMBODIMENTS

Example 1

To a solution of 21g (0.3 mole) of 2-cyanoethylamine and 18.9g (0.3 mole) of concentrated ammonium hydroxide in 300 ml of ethanol, there is added dropwise at 5°–10°C, 22.8g (0.3 mole) of carbon disulfide. After stirring the mixture for 1 hour at 25°–30°C, 48.2 g (0.3 mole) of chloromethyl kojic acid is added in one portion. Upon the addition, the temperature rises to 58°C and precipitate forms. After stirring the mixture at room temperature for 24 hours, 750 ml of water is added and the mixture stirred for an additional half hour. The precipitate is recovered by filtration, washed with water until neutral to litmus and air dried at 25°–30°C. 2-(N-2-Cyanoethyldithiocarbamylmethylene)-5-hydroxy-4H-pyran-4-one is recovered in 89 percent yield. The product recrystallized from acetone melts at 165°–166°C.

Analysis gives 10.42 percent N and 24.19 percent S compared to 10.36 percent N and 23.72 percent S calculated for $C_{10}H_{10}N_2O_3S_2$.

Example 2

The zinc chelate is prepared by adding at room temperature 4.5g (0.031 mole) of zinc chloride in 200 ml of water to a solution containing 16g (0.0619 mole) of 2-(N-2-cyanoethyldithiocarbamylmethylene)-5-hydroxy-4H-pyran-4-one and 10.9g (0.0619 mole) of 25 percent sodium hydroxide in 400 ml of water. After stirring two hours, the precipitate is recovered by filtration, washed with water until neutral and air dried at 45°C. The zinc chelate of 2-(N-2-cyanoethyldithiocarbamylmethylene)-5-hydroxy-4H-pyran-4-one is recovered in 100 percent yield (18 g). Analysis gives low values for nitrogen probably because of interference of the metal ion and 19.56 percent S compared to 18.85 percent S calculated for $C_{20}H_{18}N_4O_6S_4Zn \cdot 4(H_2O)$.

Example 3

By the procedure of Example 2, copper sulfate, nickel chloride, and cadmium sulfate are reacted to give the respective metal chelates. Analyses give 19.35 percent S compared to 18.90 percent S calculated for $C_{20}H_{18}N_4O_6S_4Cu \cdot 4H_2O$; 18.61 percent S compared to 19.03 percent S calculated for $C_{20}H_{18}N_4O_6S_4Ni \cdot 4H_2O$; and 18.15 percent S compared to 17.63 percent S calculated for $C_{20}H_{18}N_4O_6S_4Cd \cdot 4H_2O$.

To illustrate control of bacteria and fungi, a 1.0 percent stock solution or emulsion of the test material is prepared in a non-toxic solvent and diluted in agar to provide samples containing various concentrations of the test material. Petri dishes are respectively filled with the test mixture and the plates thus prepared inoculated with the test organism. After a suitable incubation period, the plates are inspected and the concentration is recorded at which complete inhibition of the growth of the organism is obtained. Identical agar test plates with no test material present show normal uninhibited growth.

At test concentrations of 100 ppm (1/10,000), 2-(N-2-cyanoethyldithiocarbamylmethylene)-5-hydroxy-4H-pyran-4-one and the Zn, Cu, Ni and Cd chelates thereof completely inhibit the growth of S. aureus, S. typhosa, Ps. aeruginosa, and A. Niger.

In one embodiment of the invention 2-(N-2-cyanoethyldithiocarbamylmethylene)-5-hydroxy-4H-pyran-4-one is applied to foliage of apple seedlings. Plants are selected for uniformity, sprayed with the toxicant and placed on carts to dry. Twenty-four hours later a spore suspension of Venturia inaequalis conidia is made and adjusted to a concentration of approximately 2,500,000 spores per ml. of water. The spore suspension is sprayed uniformly over the foliage of the treated and untreated trees. Immediately thereafter the plants are placed into the incubation chamber (100 percent relative humidity). Seventy-two hours later the trees are removed and after a drying period are placed on greenhouse benches. Two weeks later apple scab tests are evaluated. The test consists of counting the number of parasitized leaves on each plant (3 replicates per treatment), determining the average number of parasitized leaves per tree for a given treatment, and expressing the result as percent control. The percent control for each treatment is found by dividing the average number of parasitized leaves per tree in the untreated specimens into the average number of parasitized leaves per tree in the treated specimens, multiplying this number by 100 and subtracting it from 100. Comparisons are made with the commercial fungicide N-trichloromethylthio tetrahydrophthalimide (Captan). The percent control based on untreated trees (average of three) at various concentrations is shown in the following table.

| | Percent Control of Apple Scab | | | | |
|---|---|---|---|---|---|
| | Conc. ppm | | | | |
| | 600 | 100 | 60 | 10 | 3 |
| 2-(N-2-cyanoethyldithiocarbamyl-methylene)-5-hydroxy-4H-pyran-4-one | 99 | 87 | 83 | 59 | 23 |
| Captan | 100 | 85 | 66 | 56 | 0 |

The data show the toxicant of this invention is highly effective for controlling apple scab disease. No herbicidal effect upon the apple trees is observed even at the highest test concentration. In regard to phytotoxicity, at rates of 10 pounds per acre the toxicants of the Examples exhibit essentially no phytotoxic properties against a spectra of broad- and narrow-leafed plants.

In another embodiment of the invention, 2-(N-2-cyanoethyldithiocarbamylmethylene)-5-hydroxy-4H-pyran-4-one is applied to foliage of tomato plants. The procedure is essentially the same as described above for the apple tree tests except the treated and untreated plants are sprayed with a suspension of Phytophthora infestans the pathogen which causes the disease commonly called late blight. Comparisons are made with the commercial fungicide manganese ethylenebis dithiocarbamate (Maneb). The percent control based on untreated tomato plants at various concentrations is shown in the following table.

| | Percent Control of Late Blight | | | |
|---|---|---|---|---|
| | Conc. ppm | | | |
| | 300 | 100 | 30 | 10 |
| 2-(N-2-cyanoethyldithiocarbamylmethylene)-5-hydroxy-4H-pyran-4-one | 100 | 100 | 85 | 73 |
| Maneb | 100 | 95 | 34 | 0 |

The data show that the toxicant of this invention is more effective at low concentrations than the commercial fungicide. No phytotoxic effects due to the toxicant is observed. Similar tests with the chelates of this invention give substantially the same degree of control of apple scab and late blight.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. The method of inhibiting the growth of fungi or bacteria which comprises applying to the habitat of the organism a fungicidal or bactericidal amount of 2-(N-2-cyanoethyldithiocarbamylmethylene)-5-hydroxy-4H-pyran-4-one or a metal chelate thereof.

2. The method of claim 1 in which 2-(N-2-cyanoethyldithiocarbamylmethylene)-5-hydroxy-4H-pyran-4-one is employed.

3. The method of claim 1 in which a metal chelate of 2-(N-2-cyanoethyldithiocarbamylmethylene)-5-hydroxy-4H-pyran-4-one is employed.

4. The method of claim 3 in which the metal is selected from the group consisting of chromium, manganese, iron, cobalt, nickel, copper, zinc, cadmium, lead and mercury.

5. The method of claim 4 in which the metal is zinc.

6. The method of claim 4 in which the metal is copper.

7. The method of claim 4 in which the metal is nickel.

8. The method of claim 4 in which the metal is cadmium.

9. The method of claim 2 in which the habitat is foliage.

10. The method of claim 9 in which the organism is *Venturia inaequalis*.

11. The method of claim 9 in which the organism is *Phytophthora infestans*.

* * * * *